United States Patent
Lee et al.

(10) Patent No.: US 10,873,935 B2
(45) Date of Patent: Dec. 22, 2020

(54) METHOD AND APPARATUS FOR TRANSMITTING TERMINAL SUPPORT DATA FOR SPS IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 16/338,419

(22) PCT Filed: Sep. 28, 2017

(86) PCT No.: PCT/KR2017/010852
§ 371 (c)(1),
(2) Date: Mar. 29, 2019

(87) PCT Pub. No.: WO2018/062906
PCT Pub. Date: Apr. 5, 2018

(65) Prior Publication Data
US 2019/0313379 A1 Oct. 10, 2019

Related U.S. Application Data

(60) Provisional application No. 62/402,067, filed on Sep. 30, 2016.

(51) Int. Cl.
*H04W 72/04* (2009.01)

(52) U.S. Cl.
CPC ..... *H04W 72/042* (2013.01); *H04W 72/0413* (2013.01); *H04W 72/0453* (2013.01)

(58) Field of Classification Search
CPC .......... H04W 72/0413; H04W 72/042; H04W 72/0453
See application file for complete search history.

(56) References Cited

U.S. PATENT DOCUMENTS

2014/0023008 A1  1/2014  Ahn et al.
2016/0157256 A1* 6/2016  Tseng ................ H04W 72/1284
                                                        370/329

(Continued)

OTHER PUBLICATIONS

3GPP TS 36.321 V13.2.0 (Jun. 2016); 3rd Generation Partnership Project; Technical Specification Group Radio Access Network; Evolved Universal Terrestrial Radio Access (E-UTRA); Medium Access Control (MAC) protocol specification (Release 13) (Year: 2016).*

(Continued)

*Primary Examiner* — Gary Mui
(74) *Attorney, Agent, or Firm* — Lee, Hong, Degerman, Kang & Waimey

(57) ABSTRACT

User equipment (UE) can transmit UE support data for semi-persistent scheduling (SPS) to an evolved NodeB (eNB) in order to effectively allocate SPS resources for vehicle-to-everything (V2X) communication. The release of SPS can be directed by means of the UE support data. More specifically, a terminal receives, from an eNB, a plurality of SPS configurations for a plurality of logical channels, and transmits, to the eNB, UE support data comprising an SPS release directive for any one logical channel from among the plurality of logical channels.

13 Claims, 6 Drawing Sheets

(56) References Cited

U.S. PATENT DOCUMENTS

| | | | | |
|---|---|---|---|---|
| 2017/0310433 | A1* | 10/2017 | Dinan | H04W 74/08 |
| 2018/0049225 | A1* | 2/2018 | Lee | H04W 36/00 |
| 2018/0049229 | A1* | 2/2018 | Dinan | H04W 72/1268 |
| 2018/0132208 | A1* | 5/2018 | Pan | H04W 4/06 |
| 2019/0045507 | A1* | 2/2019 | Sorrentino | H04W 76/14 |
| 2019/0174522 | A1* | 6/2019 | Xiao | H04W 8/24 |
| 2019/0245657 | A1* | 8/2019 | Lee | H04L 1/18 |

OTHER PUBLICATIONS

Catt; "UE Assistance Information for SPS Transmissions"; 3GPP TSG-RAN WG2 Meeting #95 Gothenburg, Sweden, Aug. 22-26, 2016; R2-164874 (Year: 2016).*

PCT International Application No. PCT/KR2017/010852, International Search Report dated Jan. 12, 2018, 4 pages.

LG Electronics, "SL SPS configuration and UE assistant information", 3GPP TSG RAN WG2 Meeting #95, R2-165693, Aug. 2016, 8 pages.

Ericsson, "Summary of offline SPS agreements", 3GPP TSG RAN WG2 Meeting #95, R2-165762, Aug. 2016, 5 pages.

Ericsson, "Introducing Sidelink SPS in MAC", 3GPP TSG RAN WG2 Meeting #95, R2-165529, Aug. 2016, 13 pages.

Asustek, "Discussion on Multiple SL SPS for V2X Transmission", 3GPP TSG RAN WG2 Meeting #95, R2-165288, Aug. 2016, 8 pages.

3rd Generation Partnership Project (3GPP), "Technical Specification Group Radio Access Network; Evolved Universal Terrestrial Radio Access (E-UTRA); Radio Resource Control (RRC); Protocol specification (Release 13)," Section 5.6.10 of 3GPP TS 36.331 V13.2.0, Jun. 2016, 4 pages.

\* cited by examiner

METHOD AND APPARATUS FOR TRANSMITTING TERMINAL SUPPORT DATA FOR SPS IN WIRELESS COMMUNICATION SYSTEM

CROSS-REFERENCE TO RELATED APPLICATIONS

This application is the National Stage filing under 35 U.S.C. 371 of International Application No. PCT/KR2017/0010852, filed on Sep. 28, 2017, which claims the benefit of U.S. Provisional Application No. 62/402,067, filed on Sep. 30, 2016, the contents of which are all hereby incorporated by reference herein in their entirety.

BACKGROUND OF THE INVENTION

Field of the Invention

The present invention relates to wireless communication, and more particularly, to a method and apparatus for transmitting user equipment (UE) assistance information for semi-persistent scheduling (SPS) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

Semi-persistent scheduling (SPS) is a feature that greatly reduces control channel overhead for applications that require continuous radio resource allocation, such as voice over Internet protocol (VoIP). Without the SPS, all downlink (DL) or uplink (UL) physical resource block (PRB) allocations must be granted through access grant messages on the physical downlink control channel (PDCCH). This is usually sufficient for most bursty best effort type applications with large packet sizes, and thus usually only a small number of users are scheduled in each subframe. However, for applications requiring continuous allocation of small packets (e.g. VoIP), the access grant overhead of the control channel can be significantly reduced to the SPS. That is, the SPS introduces a persistent PRB allocation that the user can expect from the DL or transmit in the UL. There are various ways in which SPS can establish the persistent allocation.

As V2X communication is characterized that its message has relatively small size and can be transmitted periodically, it is being discussed how to transmit V2X messages over resources allocated by the SPS. Also, in order to facilitate resource allocation by the SPS, a method of transmitting by UE the UE assistance information related to the SPS to the network is also under discussion.

SUMMARY OF THE INVENTION

The present invention provides a method and apparatus for transmitting user equipment (UE) assistance information for semi-persistent scheduling (SPS) in a wireless communication system. The present invention provides a method and apparatus for including SPS release indication for release of SPS resources in UE assistance information for each logical channel.

In an aspect, a method for indicating a semi-persistent scheduling (SPS) release by a user equipment (UE) in a wireless communication system is provided. The method includes receiving a plurality of SPS configurations for a plurality of logical channels from a an evolved NodeB (eNB), and transmitting UE assistance information including an SPS release indication for any one logical channel among the plurality of logical channels to the eNB.

In another aspect, a user equipment (UE) in a wireless communication system is provided. The UE includes a memory, a transceiver, and a processor, operably coupled to the memory and the transceiver, and configured to control the transceiver to receive a plurality of semi-persistent scheduling (SPS) configurations for a plurality of logical channels from a an evolved NodeB (eNB), and control the transceiver to transmit UE assistance information including an SPS release indication for any one logical channel among the plurality of logical channels to the eNB.

SPS resources can be effectively released for each logical channel.

DESCRIPTION OF EXEMPLARY EMBODIMENTS

Figure 1:
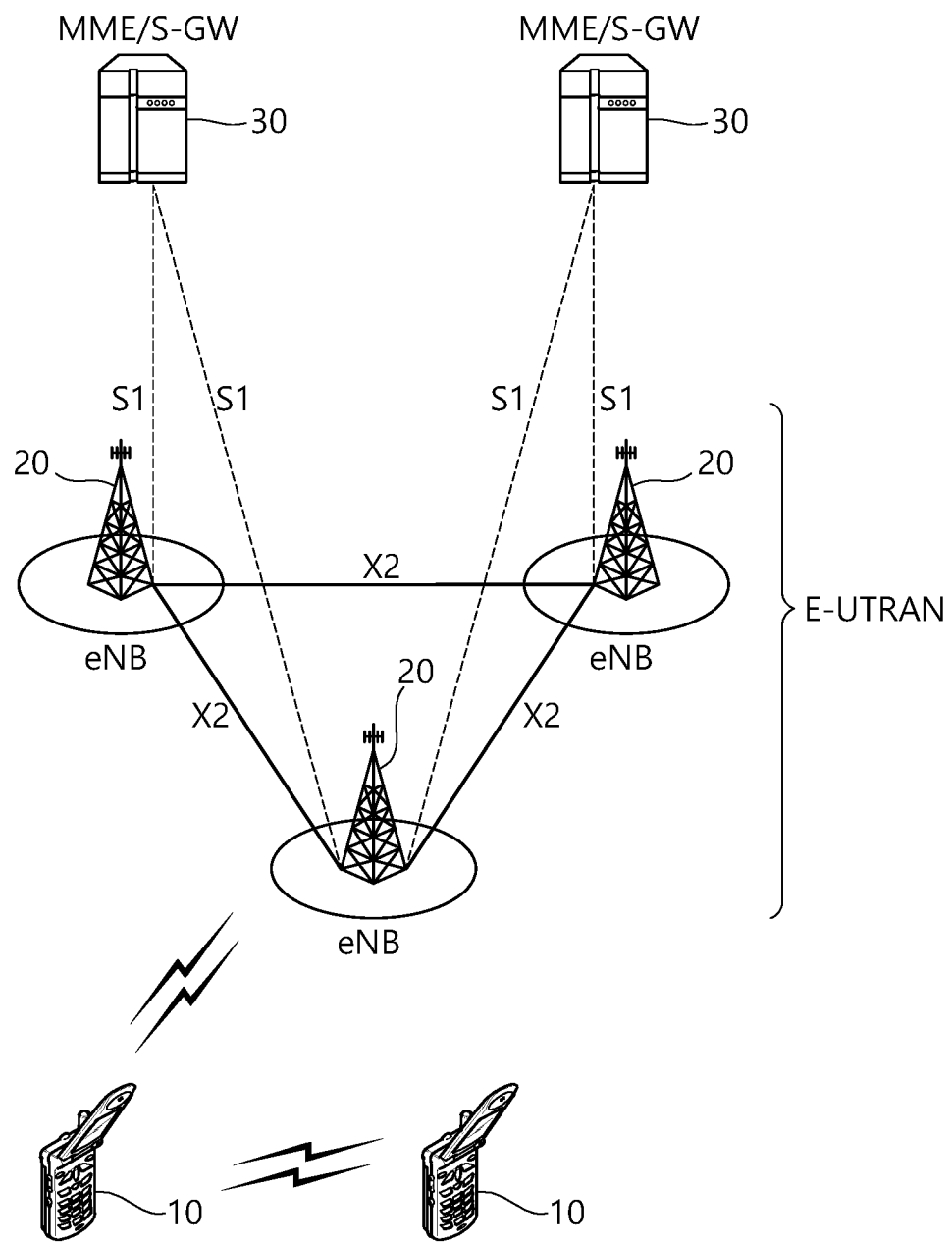
FIG. 1 shows 3GPP LTE system architecture.

FIG. 1 shows 3GPP LTE system architecture. Referring to FIG. 1, the 3GPP LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an Si interface.

Figure 2:
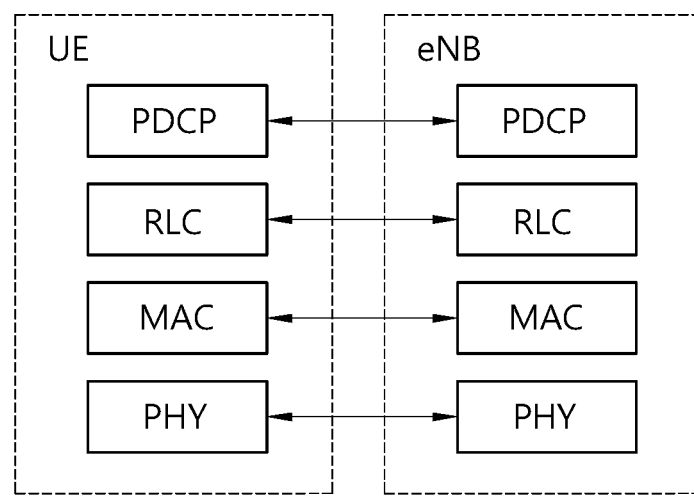
FIG. 2 shows a block diagram of a user plane protocol stack of an LTE system.
Figure 3:
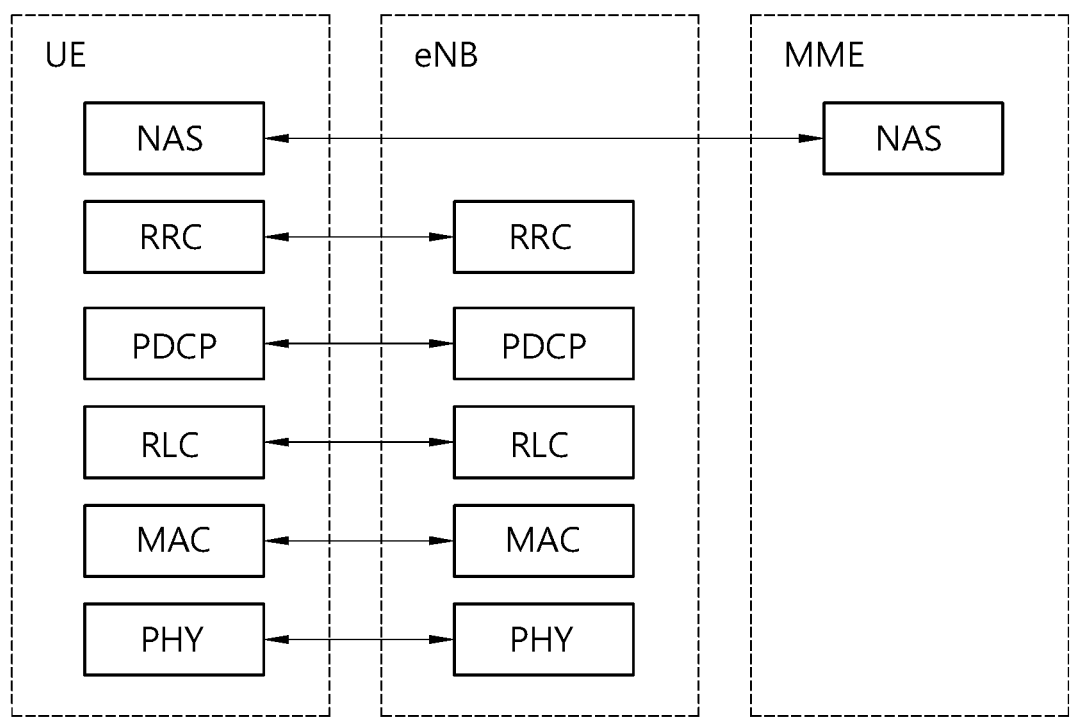
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data between the MAC layer and the PHY layer is transferred through the transport channel Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX period. Specifically, the UE monitors a paging signal at a specific paging occasion of every UE specific paging DRX period. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is UE to UE interface for sidelink communication and sidelink discovery. The Sidelink corresponds to the PC5 interface. Sidelink communication is AS functionality enabling proximity-based services (ProSe) direct communication, between two or more nearby UEs, using E-UTRA technology but not traversing any network node. Sidelink discovery is AS functionality enabling ProSe direct discovery, using E-UTRA technology but not traversing any network node.

Sidelink physical channels include a physical sidelink broadcast channel (PSBCH) carrying system and synchronization related information, transmitted from the UE, a physical sidelink discovery channel (PSDCH) carrying sidelink discovery message from the UE, a physical sidelink control channel (PSCCH) carrying control from a UE for sidelink communication, and a physical sidelink shared channel (PSSCH) carrying data from a UE for sidelink communication. The PSBCH is mapped to a sidelink broadcast channel (SL-BCH). The PSDCH is mapped to a sidelink discovery channel (SL-DCH). The PSSCH is mapped to a sidelink shared channel (SL-SCH).

In sidelink, the logical channels are also classified into control channels for transferring control plane information and traffic channels for transferring user plane information. The sidelink control channel includes a sidelink broadcast control channel (SBCCH) which is a sidelink channel for broadcasting sidelink system information from one UE to other UE(s). The SBCCH is mapped to the SL-BCH. The sidelink traffic channel includes a sidelink traffic channel (STCH) which is a point-to-multipoint channel, for transfer of user information from one UE to other UEs. The STCH is mapped to the SL-SCH. This channel is used only by sidelink communication capable UEs.

Semi-persistent scheduling (SPS) is described. E-UTRAN can allocate semi-persistent DL resources for the first HARQ transmissions to UEs. RRC defines the periodicity of the semi-persistent DL grant. PDCCH indicates whether the DL grant is a semi-persistent one, i.e. whether it can be implicitly reused in the following TTIs according to the periodicity defined by RRC.

When required, retransmissions are explicitly signaled via the PDCCH(s). In the subframes where the UE has semi-persistent DL resource, if the UE cannot find its C-RNTI on the PDCCH(s), a downlink transmission according to the semi-persistent allocation that the UE has been assigned in the TTI is assumed. Otherwise, in the sub-frames where the UE has semi-persistent downlink resource, if the UE finds its cell radio network temporary identity (C-RNTI) on the PDCCH(s), the PDCCH allocation overrides the semi-persistent allocation for that TTI and the UE does not decode the semi-persistent resources.

When carrier aggregation (CA) is configured, semi-persistent DL resources can only be configured for the primary cell (PCell) and only PDCCH allocations for the PCell can override the semi-persistent allocation. When dual connectivity (DC) is configured, semi-persistent DL resources can only be configured for the PCell or primary secondary cell (PSCell). Only PDCCH allocations for the PCell can override the semi-persistent allocation for PCell and only PDCCH allocations for the PSCell can override the semi-persistent allocation for PSCell.

In addition, E-UTRAN can allocate a semi-persistent UL resource for the first HARQ transmissions and potentially retransmissions to UEs. RRC defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), an UL transmission according to the semi-persistent allocation that the UE has been assigned in the TTI can be made. The network performs decoding of the pre-defined PRBs according to the pre-defined MCS. Otherwise, in the subframes where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

Similarly as for the DL, semi-persistent UL resources can only be configured for the PCell and only PDCCH allocations for the PCell can override the semi-persistent allocation. When DC is configured, semi-persistent UL resources can only be configured for the PCell or PSCell. Only PDCCH allocations for the PCell can override the semi-persistent allocation for PCell and only PDCCH allocations for the PSCell can override the semi-persistent allocation for PSCell.

When SPS is enabled by RRC, the following information is provided.

SPS C-RNTI;
UL SPS interval semiPersistSchedIntervalUL and number of empty transmissions before implicit release implicitReleaseAfter, if SPS is enabled for the UL;
Whether twoIntervalsConfig is enabled or disabled for UL, only for time division duplex (TDD);
DL SPS interval semiPersistSchedIntervalDL and number of configured HARQ processes for SPS numberOfConfSPS-Processes, if SPS is enabled for the DL;

When SPS for UL or DL is disabled by RRC, the corresponding configured grant or configured assignment shall be discarded.

The above information may be transmitted from SPS-Config information element (IE). The SPS-Config IE is used to specify the SPS configuration. Table 1 shows the SPS-Config IE.

TABLE 1

```
-- ASN1START
SPS-Config ::= SEQUENCE {
    semiPersistSchedC-RNTI          C-RNTI           OPTIONAL, -- Need OR
    sps-ConfigDL                    SPS-ConfigDL     OPTIONAL, -- Need ON
    sps-ConfigUL                    SPS-ConfigUL     OPTIONAL  -- Need ON
}
SPS-ConfigDL ::= CHOICE{
    release     NULL,
    setup       SEQUENCE {
        semiPersistSchedIntervalDL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        numberOfConfSPS-Processes       INTEGER (1..8),
        n1PUCCH-AN-PersistentList       N1PUCCH-AN-PersistentList,
        ...,
        [[ twoAntennaPortActivated-r10  CHOICE {
            release                         NULL,
            setup                           SEQUENCE {
                n1PUCCH-AN-PersistentListP1-r10    N1PUCCH-AN-PersistentList
            }
        }                                                    OPTIONAL -- Need ON
        ]]
    }
}
SPS-ConfigUL ::= CHOICE {
    release                         NULL,
    setup                           SEQUENCE {
        semiPersistSchedIntervalUL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }                                                    OPTIONAL, -- Need OP
        twoIntervalsConfig              ENUMERATED {true}    OPTIONAL, -- Cond TDD
        ...,
        [[ p0-PersistentSubframeSet2-r12    CHOICE {
            release                             NULL,
            setup                               SEQUENCE {
                p0-NominalPUSCH-PersistentSubframeSet2-r12   INTEGER (-126..24),
                p0-UE-PUSCH-PersistentSubframeSet2-r12       INTEGER (-8..7)
```

TABLE 1-continued

```
    }
   }
  ]]                                   OPTIONAL -- Need ON
 }
}
}
N1PUCCH-AN-PersistentList ::=    SEQUENCE (SIZE (1..4)) OF INTEGER (0..2047)
-- ASN1STOP
```

As described above, the SPS-Config IE may include at least one of the SPS C-RNTI (semiPersistSchedC-RNTT), the UL SPS interval (semiPersistSchedIntervalUL), the number of empty transmissions before implicit release (implicitReleaseAfter), whether twoIntervalsConfig is enabled for the UL (twoIntervalsConfig), the DL SPS interval (semiPersistSchedIntervalDL), and the number of configured HARQ processes for SPS (numberOfConfSPS-Processes) if the SPS is enabled for the DL.

UE assistance information is described. This can be referred to Section 5.6.10 of 3GPP TS 36.331 V13.2.0 (2016-06). The purpose of this procedure is to inform E-UTRAN of the UE's power saving preference. Upon configuring the UE to provide power preference indications (PPI), E-UTRAN may consider that the UE does not prefer a configuration primarily optimized for power saving until the UE explicitly indicates otherwise.

Figure 4:
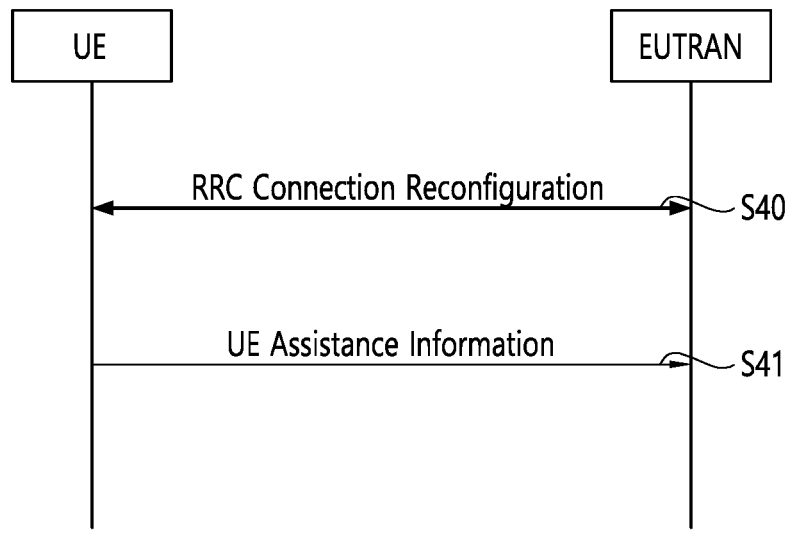
FIG. 4 shows a UE assistance information procedure.

FIG. 4 shows a UE assistance information procedure. In step S40, the UE and the E-UTRAN perform an RRC connection reconfiguration procedure. In step S41, the UE transmits the UE assistance information to the E-UTRAN. A UE capable of providing PPI in RRC_CONNECTED may initiate the procedure in several cases including upon being configured to provide PPI and upon change of power preference.

Upon initiating the procedure, the UE shall:

1> if configured to provide power preference indications:

2> if the UE did not transmit a UEAssistanceInformation message since it was configured to provide power preference indications; or 2> if the current power preference is different from the one indicated in the last transmission of the UEAssistanceInformation message and timer T340 is not running:

3> initiate transmission of the UEAssistanceInformation message.

The UE shall set the contents of the UEAssistanceInformation message:

1> if the UE prefers a configuration primarily optimised for power saving:

2> set powerPrefIndication to lowPowerConsumption;

1> else:

2> start or restart timer T340 with the timer value set to the powerPrefIndicationTimer;

2> set powerPrefIndication to normal;

The UE shall submit the UEAssistanceInformation message to lower layers for transmission.

Table 2 shows an example of the UE assistance information.

TABLE 2

```
-- ASN1START
UEAssistanceInformation-r11 ::= SEQUENCE {
    criticalExtensions              CHOICE {
        c1                              CHOICE {
            ueAssistanceInformation-r11     UEAssistanceInformation-r11-IEs,
            spare3 NULL, spare2 NULL, spare1 NULL
        },
        criticalExtensionsFuture        SEQUENCE { }
    }
}
UEAssistanceInformation-r11-IEs ::= SEQUENCE {
    powerPrefIndication-r11         ENUMERATED {normal, lowPowerConsumption}
OPTIONAL,
    lateNonCriticalExtension        OCTET STRING                            OPTIONAL,
    nonCriticalExtension            SEQUENCE { }                            OPTIONAL
}
-- ASN1STOP
```

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g. RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g. RSU, application server, etc.

In V2X communication, messages such as common awareness messages (CAM), decentralized environmental notification messages (DENM), or basic safety messages (BSM) may be transmitted. The CAM includes information such as the type, position, speed, and direction of the vehicle, and may be periodically broadcast by all vehicles. The DENM includes information such as the type of a specific event, the region where a specific event occurred, etc., and may be broadcast by an RSU or a vehicle. The BSM is included in the US J2735 safety message and has features similar to CAM. The BSM may provide emergency brake warning, front collision warning, intersection safety support, blind spot and lane change warning, overtaking warning, and out of control warning service.

Due to the nature of V2X communication, a method of transmitting a V2X message using resources allocated through SPS is being discussed. That is, a method of transmitting the V2X message to a network or another UE using UL SPS resource or SL SPS resource is under discussion. To help with resource allocation by the SPS, it was agreed that the UE would send UE assistance information for the SPS to the network. The UE assistance information for the SPS may be included in the UE assistance information described in FIG. 4. In the following description, the UE assistance information for the SPS is simply referred to as the SPS assistance information. Also, in the following description, it is assumed that the UE assistance information includes SPS assistance information. The following are agreed on SPS enhancement and the UE assistance information.

- Multiple SPS configurations can be simultaneously activated.
- Transmission of the UE assistance information can be triggered based on UE implementation.
- The UE assistance information may include a set of timing offsets for subframe 0 of system frame number (SFN) 0 and a preferred SPS period.
- The UE assistance information may be reported when a change in the estimated period of arriving packets occurs.
- The UE assistance information may be reported when a change in the estimated offset of the arriving packet occurs.
- The UE assistance information may be configured by an eNB.
- The UE assistance information may be reported both when the SPS is configured and when the SPS is not configured.
- The UE assistance information may be configured for either each of existing SPS configuration or each of new SPS configuration.
- The report of the UE assistance information is configured by the eNB for at least PC5 V2X.
- If the UE assistance information is configured by the eNB, the UE assistance information may additionally include an SPS index of the SPS configuration.

Based on the above agreement, the present invention proposes detailed features of the UE assistance information through various embodiments.

(1) Whether the UE assistance information is reported per each logical channel or each ProSe per-packet priority (PPPP) has not yet been determined. If different types of messages with the same PPPP are sent together via SPS resources, it is expected that it will be difficult for the UE to predict the combined traffic pattern. That is, it is expected that the UE assistance information will not accurately reflect the combined traffic pattern. Thus, according to one embodiment of the present invention, it may be proposed that UE assistance information is reported for each logical channel.

(2) As described above, the UE assistance information may be reported regardless of whether the SPS is configured, and the UE assistance information may be provided for each of existing SPS configuration or each of new SPS configuration. Before the SPS is configured, an application layer forwards the V2X message to AS layer 2. Thus, there is data that can be transmitted to the SL buffer. It can be assumed that reporting of the UE assistance information is triggered only when there is data that can be transmitted in the SL buffer. That is, if there is no data that can be transmitted in the SL buffer, the UE should not trigger the reporting of the UE assistance information. Thus, in accordance with an embodiment of the present invention, it may be proposed that the reporting of the UE assistance information is triggered only when there is data available that can be transmitted in the SL buffer, i.e. the layer 2.

(3) It is unclear how the UE can initially estimate the period of the V2X message transmission, when the first data can be transmitted in the layer 2, i.e., when the V2X message transmission is started. As a first option to this, the UE may initially estimate the period of the V2X message transmission based on the interaction with the application layer. This option may be possible because the vehicle initially leaves a parking lot at zero or low speed. However, this option may not work well in some cases, for example in the case of event triggered messages.

As a second option, the UE may not report the UE assistance information until it can better estimate a traffic pattern for the logical channel. In this option, the UE may initially transmit only the sidelink buffer status report (BSR) to the eNB. Based on the sidelink BSR, the eNB can allocate sidelink mode 3 resource with dynamic scheduling.

As the above options are considered, when a V2X message transmission is started, a particular UE may not report the UE assistance information until the UE can better estimate the traffic pattern. If the UE assistance information includes the packet size for each logical channel, the UE may report the UE assistance information including the packet size for each logical channel without periodicity and timing offset until the traffic pattern is estimated. In this case, the eNB may dynamically allocate resources for the sidelink mode 3 resource based on the UE assistance information.

(4) The UE assistance information may include the packet size. If the packet size is included in the UE assistance information, the packet size may be the total amount of data that can be transmitted. Also, as described above, the reporting of the UE assistance information can be triggered only when there is data that can be transmitted in the SL buffer, so that the packet size included in the UE assistance information is not the estimated size but an exact size of the data in the SL buffer.

Also, if the UE assistance information includes packet size and UE assistance information is provided for each logical channel, the packet size may be calculated for the corresponding logical channel That is, the UE assistance information may include the total amount of data that can be transmitted for the logical channel. If the UE assistance information is reported for the PPPP, the packet size included in the UE assistance information may be the total amount of data that can be transmitted over all logical channels associated with the PPPP.

In summary, according to one embodiment of the present invention, the UE assistance information may include the packet size, which is defined as the total amount of data that can be transmitted for the logical channel (or all logical channels associated with the PPPP).

(5) If the UE assistance information includes the packet size, there is no need to use the sidelink BSR for the logical channel (or the PPPP) for which the UE assistance information is reported. Assuming that the packet size included in the UE assistance information is provided for each logical channel, the packet size for each logical channel included in the UE assistance information can provide more influence to the eNB than the sidelink BSR for an SPS operation for each logical channel. That is, if the packet size is included in the UE assistance information for the STCH, a sidelink BSR report is not needed.

Thus, an SR prohibit Timer (logicalChannelSR-ProhibitTimer) or SR masking (logicalChannelSR-Mask) needs to be supported for the logical channel associated with the UE assistance information (or all logical channels associated with the PPPP). For the UL, the above parameters can be configured by the eNB. In this case, however, the SL prohibit timer (logicalChannelSR-ProhibitTimer) and the SR masking (logicalChannelSR-Mask) need not be configured by the eNB. When UE assistance information including the packet size is configured to be reported for the logical channel (or all logical channels associated with PPPP), the SL prohibit timer (logicalChannelSR-ProhibitTimer) or the SR masking (logicalChannelSR-Mask) may be configured for the corresponding logical channel without an explicit signaling from the eNB. In summary, in accordance with an embodiment of the present invention, when the UE assistance information including the packet size is configured to be reported on the STCH (or all STCHs associated with PPPP), the SL prohibit timer (logicalChannelSR-ProhibitTimer) or the SR masking (logicalChannelSR-Mask) may be considered to be configured for the corresponding STCH from the eNB.

(6) One issue that may arise from the UE assistance information for each logical channel is that the eNB may not know a priority from the logical channel identifier (LCID) in the UE assistance information. The eNB may require priority information such as the PPPP to schedule the sidelink mode 3 transmissions. Thus, according to one embodiment of the present invention, the LCID included in the UE assistance information may be mapped to PPPP according to the configuration from the eNB or pre-configuration. Accordingly, an eNB scheduler may understand the priority information for the logical channel from the LCID included in the UE assistance information.

(7) Furthermore, if the UE has to inform the eNB for the SPS release, the UE may prefer to indicate a stop of transmission (or SPS release) in the UE assistance information. Such an indication of stop of transmission for SPS release may be included in the UE assistance information for each logical channel (or all logical channels associated with PPPP). This indication need not be explicit in the UE assistance information. For example, a periodicity set to zero, a particular LCID value, or a packet size of zero may be used as an indication of the stop of transmission for SPS release.

Meanwhile, the CAM transmission may continue until the vehicle is not moving. Therefore, SPS release may not be useful for the CAM. However, SPS release may be useful for the DENM. In the case of DENM, the AS layer can understand the stop of transmission in the DENM based on its interaction with the application layer. Thus, it may depend on the UE implementation to decide when to indicate the UE to stop transmission for the logical channel. In addition, even if the UE indicates the eNB to stop transmitting for releasing the SPS, whether or not the actual SPS is released may depend on the eNB.

In summary, according to an embodiment of the present invention, when the UE indicates the eNB to stop of transmission for the SPS release, the indication may be included in the UE assistance information for each logical channel. However, whether or not the actual SPS is released may depend on the eNB. In addition, it may depend on the UE implementation to determine when the UE will indicate the stop of transmission for SPS release.

(8) Considering various aspects of the UE assistance information according to the above-mentioned embodiment of the present invention, the UE assistance information may include at least one of the following information.

Periodicity (if necessary, the periodicity set to 0 may mean an SPS release request)
Timing offset
LCID
The total amount of data that can be transmitted (not the estimated packet size)

SPS index (if SPS is configured)

(9) Meanwhile, it is preferable to avoid the case where the UE continuously triggers the transmission of the same UE assistance information. For example, the UE may request a specific period and/or a specific timing offset. However, if the eNB does not accept the corresponding request, the UE may re-trigger the transmission of the UE assistance information including the same contents. Thus, according to one embodiment of the present invention, the UE should not continuously trigger the transmission of UE assistance information including the same contents.

(10) It is unclear whether the current SPS is associated with the LCID or the PPPP. A typical V2X use case for multiple SPSs is a parallel transmission of the CAM and the DENM. Different types of messages may have different periods and timing offsets. In this case, different types of messages may be allocated to different SPS resources via different logical channels.

However, different types of messages on different logical channels may not always have different PPPPs. That is, different types of messages with the same PPPP may be sent together on the SPS resource. If different traffic patterns are mixed in the same SPS resource, the UE may find it difficult to estimate the combined traffic patterns of messages with different periods and timing offsets. Therefore, the SPS configuration is highly likely to be associated with a logical channel Thus, according to one embodiment of the present invention, the SPS configuration may be associated with a logical channel.

Figure 5:
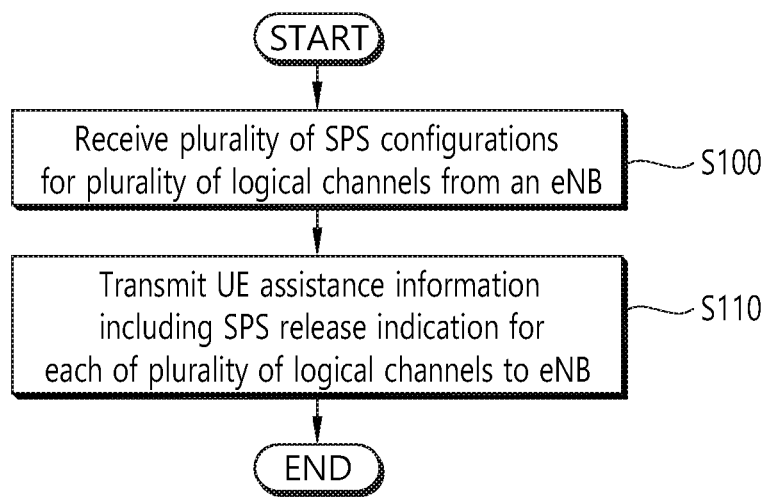
FIG. 5 shows a method for indicating an SPS release by a UE according to an embodiment of the present invention.

FIG. 5 shows a method for indicating an SPS release by a UE according to an embodiment of the present invention. The various embodiments of the present invention described above may be applied to the embodiment.

In step S100, the UE receives a plurality of SPS configurations for a plurality of logical channels from an eNB. In step S110, the UE transmits UE assistance information including an SPS release indication for any one logical channel among the plurality of logical channels to the eNB. The UE assistance information may only be transmitted when there is data that can be transmitted to a sidelink buffer.

The UE assistance information may include an LCID, an SPS periodicity, an SPS timing offset, and a packet size for the any one logical channel. The SPS release indication may be indicated by the SPS periodicity set to zero. Alternatively, the SPS release indication may be indicated by the LCID set to a specific value. Alternatively, the SPS release indication may be indicated by the packet size set to zero. The packet size for the any one logical channel may correspond to the total amount of data that can be transmitted for the any one logical channel. An SR prohibit timer and SR masking for the any one logical channel can be configured. The LCID may be mapped to the PPPP by configuration by the eNB or pre-configuration.

Figure 6:
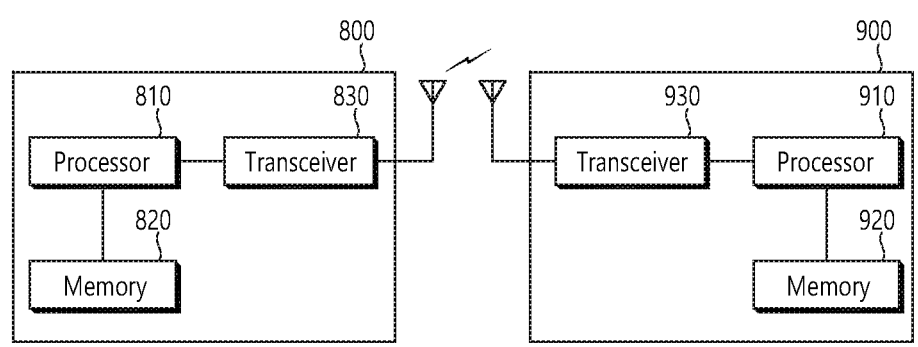
FIG. 6 shows a wireless communication system to implement an embodiment of the present invention.

FIG. 6 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for indicating a semi-persistent scheduling (SPS) release by a user equipment (UE) in a wireless communication system, the method comprising:
    selecting a cell on an evolved NodeB (eNB);
    receiving, from the cell, a radio resource control (RRC) connection reconfiguration;
    receiving, from the cell, a plurality of SPS configurations for a plurality of logical channels; and
    transmitting, to the cell, UE assistance information including an SPS release indication for any one logical channel among the plurality of logical channels in response to the RRC connection reconfiguration,
    wherein the UE assistance information includes a packet size for the any one logical channel, and
    wherein the packet size for the any one logical channel corresponds to a total amount of data available for transmission for the any one logical channel.

2. The method of claim 1, wherein the UE assistance information further includes a logical channel identifier (LCD), an SPS periodicity and an SPS timing offset, for the any one logical channel.

3. The method of claim 2, wherein the SPS release indication is indicated by the SPS periodicity which is set to 0.

4. The method of claim 2, wherein the SPS release indication is indicated by the LCD which is set to a specific value.

5. The method of claim 2, wherein the SPS release indication is indicated by the packet size which is set to 0.

6. The method of claim 2, wherein a scheduling request (SR) prohibit timer and a SR masking for the any one logical channel are configured.

7. The method of claim 2, wherein the LCID is mapped to a ProSe per-packet priority (PPPP) by a configuration by the eNB or a pre-configuration.

8. The method of claim 1, wherein the UE assistance information is transmitted only when there is data available for transmission in a sidelink buffer.

9. A user equipment (UE) in a wireless communication system, the UE comprising:
a memory;
a transceiver; and
a processor, operably coupled to the memory and the transceiver, and configured to:
select a cell on an evolved NodeB (eNB);
control the transceiver to receive, from the cell, a radio resource control (RRC) connection reconfiguration;
control the transceiver to receive, from the cell, a plurality of semi-persistent scheduling (SPS) configurations for a plurality of logical channels; and
control the transceiver to transmit, to the cell, UE assistance information including an SPS release indication for any one logical channel among the plurality of logical channels in response to the RRC connection reconfiguration,
wherein the UE assistance information includes a packet size for the any one logical channel, and
wherein the packet size for the any one logical channel corresponds to a total amount of data available for transmission for the any one logical channel.

10. The UE of claim 9, wherein the UE assistance information further includes a logical channel identifier (LCD), an SPS periodicity and an SPS timing offset, for the any one logical channel.

11. The UE of claim 10, wherein the SPS release indication is indicated by the SPS periodicity which is set to 0.

12. The UE of claim 10, wherein the SPS release indication is indicated by the LCD which is set to a specific value.

13. The UE of claim 10, wherein the SPS release indication is indicated by the packet size which is set to 0.

* * * * *